Smith & Sparks,
Shutter Fastener.
N° 60,584.    Patented Dec. 18, 1866.

Witnesses:
John H. Shumway.
Attni J. Libbitz.

Inventors:
J. T. Smith
Wm E. Sparks
Bethial John E. Earl

United States Patent Office.

IMPROVEMENT IN BLIND-FASTENERS.

G. TRUMAN SMITH AND WILLIAM E. SPARKS, OF NEW HAVEN, CONNECTICUT.

Letters Patent No. 60,584, dated December 18, 1866.

*The Schedule referred to in these Letters Patent and making part of the same.*

TO ALL WHOM IT MAY CONCERN:

Be it known that we, G. TRUMAN SMITH and WILLIAM E. SPARKS, of New Haven, in the county of New Haven, and State of Connecticut, have invented a new Improvement in Blind-Fasteners; and we do hereby declare the following, when taken in connection with the accompanying drawings, and the letters of reference marked thereon, to be a full, clear, and exact description of the same, and which said drawings constitute part of this specification, and represent in—

Figures 1, 2:
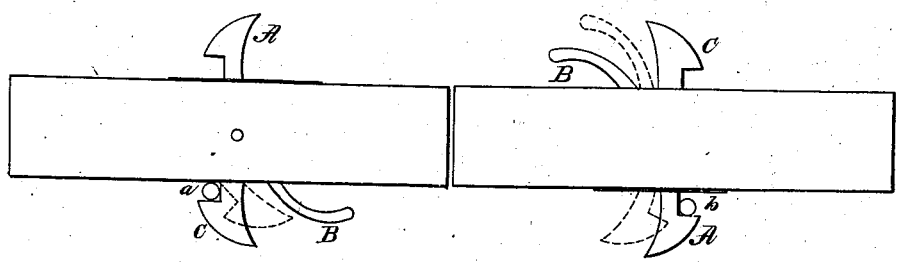

Figure 1, the blind as closed and secured upon the inside.

Figure 2, the blind open and secured upon the outside.

Figures 3, 4, 5, and 6, the parts of the fastener detached; and in

Figure 7:
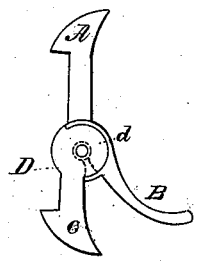

Figure 7, the same parts as put together for use.

Our invention relates to an improvement in that class of blind-fastenings designed to secure the blind upon the inside so that it may not be opened from the outside; and to enable others skilled in the art to construct and apply our invention, we will proceed to describe the same as illustrated in the accompanying drawings.

Figure 3:
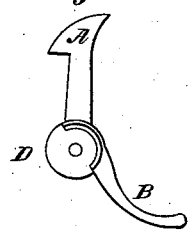
Figures 4, 5, 6:
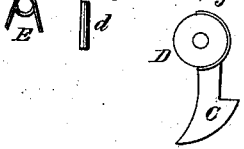

A is the latch which secures the blind when open, seen in fig. 3, and is provided with a tail-piece, B, which extends through the blind, as seen in fig. 1, forming a lever by which to operate the latch, A. C is a latch of similar form which secures the blind upon the inside. The two latches are formed upon plates, D, so that when placed together, as in fig. 7, there will be formed a recess between the two said plates to receive a spring, E, fig. 4, and as denoted in red, fig. 7. Centrally through the two plates, D, is placed a pivot, d, as seen in figs. 5 and 7. The two latches may be fitted, and the said pivot secure them into a plate by which they may be secured in the blind, yet a small mortise through the blind, and the parts placed therein as seen in fig. 1, may there be secured by the pivot as seen in fig. 1. The blind is secured upon the inside by the latch, C, catching upon a pin or other device, a, upon the window sill, and when open, by the latch, A, latching upon a hook or other device, b, upon the wall in the usual manner. To open the blind, press back the latch, C, as denoted in red; this movement, though upon the same pivot as the latch, A, has no effect upon the latch, A, each latch in its own movement being independent of the other. Thus moved from the catch, a, the blind is opened in the usual manner, and swung around to the position denoted in fig. 2; the latch, A, catches upon the hook, b, and secures the blind in that position, from which it may be released by pressing the lever, B, into the position denoted in red, which turns the latch from the hook, b, as also denoted in red; thus it will be seen that when the blind is closed it cannot be opened by any movement of the latch, A, upon the outside.

Having therefore thus fully described our invention, what we claim as new and useful, and desire to secure by Letters Patent, is—

The combination of the latch A, provided with the lever B, with the latch C, when constructed and arranged so as to operate in the manner and for the purpose specified.

G. TRUMAN SMITH,
WILLIAM E. SPARKS.

Witnesses:
JOHN E. EARLE,
ALTSIE J. TIBBITS.